United States Patent [19]

Griffith

[11] 4,346,028
[45] Aug. 24, 1982

[54] ASBESTIFORM CRYSTALLINE CALCIUM SODIUM OR LITHIUM PHOSPHATE, PREPARATION AND COMPOSITIONS

[75] Inventor: Edward J. Griffith, Manchester, Mo.

[73] Assignee: Monsanto Company, St. Louis, Mo.

[21] Appl. No.: 209,221

[22] Filed: Nov. 24, 1980

Related U.S. Application Data

[63] Continuation-in-part of Ser. No. 153,664, May 27, 1980, abandoned, which is a continuation-in-part of Ser. No. 103,787, Dec. 14, 1979, abandoned.

[51] Int. Cl.$^3$ .............................................. C01B 25/30
[52] U.S. Cl. ................................ 524/417; 106/193 J; 423/306; 423/314; 523/451; 523/506; 524/706
[58] Field of Search ............................... 423/306, 314; 106/193 J; 260/37 N, 37 EP, 37 R, 39 R, 40 R, 42.46, 42.47, 42.49, 42.52

[56] References Cited

U.S. PATENT DOCUMENTS 2,280,848  4/1942  Pole ..................................... 423/314

FOREIGN PATENT DOCUMENTS 522352    3/1956  Canada ................................ 423/314
1199246   8/1965  Fed. Rep. of Germany ...... 423/314

*Primary Examiner*—Earl C. Thomas
*Assistant Examiner*—Wayne A. Langel
*Attorney, Agent, or Firm*—W. H. Duffey; R. C. Griesbauer

[57] ABSTRACT

Asbestiform crystalline calcium M phosphate, where M is sodium or lithium, having a length to average diameter ratio of at least 5:1, can be prepared by forming a melt of a source of oxygen, calcium, phosphorus and M having a mole ratio of about 15 percent to about 30 percent $M_2O$, about 48 percent to about 60 percent $P_2O_5$ and about 20 percent to about 37 percent CaO, cooling the melt within the range of about 500° C. to about 750° C. for a sufficient time to permit blocks of calcium M phosphate to form, and fiberizing the blocks into the asbestiform crystals. Such asbestiform crystalline calcium M phosphates are useful to prepare composites of organic polymeric materials.

15 Claims, 1 Drawing Figure

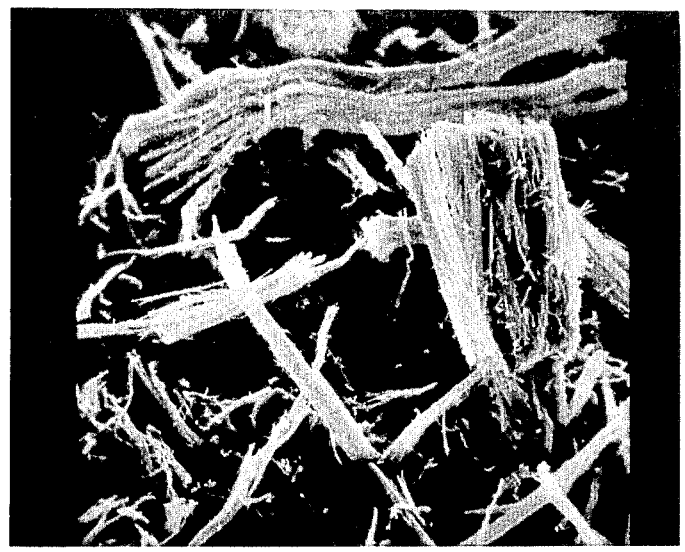

4,346,028

ASBESTIFORM CRYSTALLINE CALCIUM SODIUM OR LITHIUM PHOSPHATE, PREPARATION AND COMPOSITIONS

CROSS REFERENCE TO RELATED APPLICATIONS

This application is a continuation-in-part of Application Ser. No. 153,664 filed May 27, 1980, now abandoned which is a continuation-in-part of Application Ser. No. 103,787 filed Dec. 14, 1979, now abandoned.

BACKGROUND OF THE INVENTION

This invention relates to a new crystalline form of calcium M phosphate where M is sodium or lithium and a method for its preparation. More particularly, this invention relates to unique asbestiform crystalline calcium M phosphate having the form of very thin, flexible fibers and to a process for preparing such asbestiform crystals, i.e., having the form or appearance of asbestos.

Each year billions of kilograms of asbestos, fiberglass and other inorganic fibers are used in a wide variety of applications, such as for composites with organic polymeric materials like plastics, resins, natural and synthetic elastomers and the like. Such composites are used to make floor tiles, gaskets, brake linings, clutch facings and numerous other objects commonly found in industry and in the home.

Although satisfactory performance is achieved by the use of such fibrous materials in these applications, they also have certain disadvantages. For example, many of these fibrous materials, especially asbestos, are suspected of causing a rare cancer, mesothelioma, as well as other diseases, such as asbestosis, bronchogenic cancer and gastrointestinal cancer (see, for example, "Asbestos-Related Disease", L. Preges et al., Grune and Stratton, New York, 1978 and "Asbestos—Properties, Applications and Hazards", Editor, L. Michaels et al., John Wiley and Sons, New York, 1979). In addition, many inorganic fibers, such as the alkali metal titanates, are suspected of causing such health problems among users of the fibers. On the other hand, some inorganic fibers are soluble in water, dilute acid or dilute alkali which limits the usefulness of such fibers.

Condensed phosphates are the only known variety of inorganic substances which are capable of forming fibers and at the same time are normally found in living systems. J. R. VanWazer reports in "Phosphorus And Its Compounds", Vol. 1, Interscience Publishers, Inc., New York (1959) at pages 456 and 800 that long chain phosphates have been identified in yeast, molds, algae and bacteria. An enzymatic synthesis of long chain phosphate salts has been described and is believed to occur by donation of the terminal $PO_4$ group of adenosine triphosphate. Although there is still much to be learned about the various phosphatases which catalyze the schism of the P—O—P linkages, it is known that the enzymatic hydrolysis of chain and ring compounds can be extremely rapid in the presence of dipositive cations, such as calcium and especially magnesium. Hence, if a fiber or asbestiform crystal which can degrade to a nutrient in the body while remaining stable in the absence of enzymes should create no health problems and should be suitable for many applications where fibrous materials are needed.

Those skilled in the art are aware that fibers can be prepared by drawing a fiber from a glassy phosphate or that certain phosphates, such as crystalline potassium metaphosphate, sometimes called potassium Kurrol's salt, form acicular crystals. However, the usefulness of such amorphous or crystalline fibers is limited because of their solubility in aqueous systems and/or low tensile strength. In addition, such fibers are frequently too large to use for numerous applications.

Thus, it can be seen that there is a need for an inorganic fibrous material that can be prepared in very small diameters and relatively short lengths and which can withstand temperatures up to about 725° C. for use as insulation and as a reinforcing aid in polymeric materials, which is virtually insoluble in water, dilute acid or dilute alkali, and which does not present undue health hazards to those using the material. Now, according to the present invention, an inorganic, asbestiform crystal has been developed which can have an average diameter of less than 1 micron and which has most of the advantageous properties of other known fibrous materials within this size range. However, unlike most other inorganic fibers, the asbestiform crystal of the present invention is attacked by enzymes of biological systems which not only renders the hydrolysis products relatively harmless to mammals, such as humans, but also provides nutrients to the biological system.

SUMMARY OF THE INVENTION

These and other advantages are achieved by asbestiform crystalline calcium M phosphate. Such asbestiform crystals are very thin, flexible fibers which are insoluble in water, are acid, alkali and temperature resistant. Asbestiform crystalline calcium sodium phosphate has a melting point of about 780° C. and the calcium lithium phosphate has a melting point of about 750° C.

Such asbestiform crystalline calcium M phosphates, where M is sodium or lithium, can be produced by a process which comprises:
(a) bringing together under reaction conditions a source of oxygen, calcium, phosphorus and M wherein the mole ratios are about 15 mole percent to about 30 mole percent $M_2O$, about 48 mole percent to about 60 mole percent $P_2O_5$ and about 20 mole percent to about 37 mole percent CaO to form a phosphate salt mixture;
(b) maintaining the phosphate salt mixture at a temperature below about the melting point of the calcium M phosphate for a sufficient time to form blocks of calcium M phosphate; and
(c) fiberizing the blocks into asbestiform crystals.

DESCRIPTION OF THE FIGURE

The sole FIGURE in this application is a picture taken with the aid of an electron scanning microscope at a magnification of 1,000 times of a typical asbestiform crystalline calcium sodium phosphate of the present invention prepared according to the process described below.

DETAILED DESCRIPTION OF THE INVENTION

Preparation

The preparation of asbestiform crystalline calcium M phosphate of the present invention depends on a number of factors as will occur to those skilled in the art in view of the present disclosure. The ratio of calcium to phosphorus and the ratio of sodium or lithium to phosphorus in the melt is important. In addition, the concentration and types of impurities can affect crystal shape and growth. Other important variables are time and temperature at which the phosphate salt mixture is maintaned, the recovery techniques and the like.

Any number of materials known to those skilled in the art can be used as a source of oxygen, calcium, phosphorus and sodium or lithium to prepare the asbestiform crystalline calcium M phosphate. Suitable sources of calcium include calcium phosphates and basic calcium-containing materials, such as calcium carbonate, calcium oxide, calcium hydroxide and mixtures thereof, including mixtures commonly known as slaked lime, quick lime, hydrated lime and the like. Suitable sources of phosphorus include phosphorus pentoxide, phosphoric acid and orthophosphate salts such as sodium or lithium dihydrogen phosphate, disodium hydrogen phosphate, trisodium or trilithium phosphate, the sodium or lithium salts of condensed phosphates which contain at least one P—O—P linkage, such as the metaphosphates, the pyrophosphates, glassy phosphates and the like. Mixtures of salts, acids or oxides can be used in any combination. Suitable sources of sodium or lithium include the sodium or lithium orthophosphates and condensed phosphates, such as those discussed above, and sodium or lithium hydroxide and sodium or lithium carbonate, and the like. It is usual to avoid the presence of large amounts of anions other than carbonates, hydroxides and phosphates, since the presence of more than trace amounts of such anions as sulfates, halides and the like may affect the growth of the asbestiform crystals.

The mole ratio of sodium or lithium, calcium and phosphorus is important in the process to prepare asbestiform crystalline calcium M phosphates of the present invention. Referring now to the ternary listing of $P_2O_5$, CaO and $M_2O$, where M is sodium or lithium, asbestiform crystals can be formed within the composition ranges set forth below wherein the compositions are in mole percent.

| $M_2O$ | $P_2O_5$ | CaO |
|---|---|---|
| 30–25 | 50 | 20–25 |
| 20 | 48–60 | 20–32 |
| 15 | 48–55 | 30–37 |

Although a few asbestiform crystals can be obtained when using compositions outside of the above ranges, these compositions provide at least about 10 weight percent asbestiform crystals using the process of the present invention. It is preferred to use compositions where greater amounts of asbestiform crystals can be obtained, for example, at least 50 weight percent, which is obtained when at least about 17 mole percent $M_2O$ is used along with about 48 mole percent to about 54 mole percent $P_2O_5$, the remainder being CaO. It is preferred to use about 20 mole percent to about 25 mole percent $M_2O$, about 48 mole percent to about 53 mole percent $P_2O_5$, and about 25 mole percent to about 32 mole percent CaO.

The purity of the materials used as a source of phosphorus, calcium and sodium or lithium affects the yield of the asbestiform crystalline calcium M phosphate. In some cases, if the impurity concentration is sufficiently high, only a glass will be obtained. It is preferred to use reagent grade materials to control the level of impurities. On the other hand, when certain levels of impurities are present, on the order of 250 to 1,000 ppm, the morphology of the calcium M phosphate crystal is modified and in many cases the use of certain impurities is desired to provide asbestiform crystalline calcium M phosphate with desired physical characteristics. For example, it is believed that trace levels of aluminum, zinc, molybdenum, cobalt, copper, silver, cesium, silicon, magnesium, iron, nickel, vanadium and the like may enhance the physical characteristics of the resultant asbestiform crystals. However, trace quantities of boron or titanium can inhibit the formation of asbestiform crystals and the presence of such trace elements is not preferred.

According to the present invention, the materials used as a source of phosphorus, calcium, M and oxygen are brought together in proportions to provide the ratios described above, and heated to form a mixture of the phosphate salts. Although satisfactory results are achieved when the source materials are substantially dry, sufficient water can be added to form a paste or thick slurry of the source materials to aid in mixing. The source materials, with or without the added water, can be placed in a suitable container, such as a platinum dish or ceramic crucible, and heated to temperatures up to about 200° C. to evaporate excess moisture. Thereafter, the source materials are heated to temperatures usually between about 500° C. and 1200° C., and maintained at such temperatures for a sufficient length of time to insure that the materials have reacted, usually about one hour. When an open container is used, excessive times at temperatures above about 800° C. where the salts are molten can change the ratio of calcium, phosphorus and M since phosphates can evaporated at such temperatures, and hence, it is preferred to heat the materials for less than about two hours in an open container. On the other hand, hot phosphorus pentoxide obtained by burning elemental phosphorus, lime or calcium carbonate, and sodium or lithium hydroxide or carbonate can be reacted together in the mole ratios described above, and the heats of reaction can be sufficient to form a phosphate salt mixture in an insulated container.

Then, the mixture of phosphate salts is maintained at a temperature below the melting point of calcium M phosphate, about 780° C. for calcium sodium phosphate and for calcium lithium phosphate, about 750° C. for a sufficient time to form blocks of calcium M phosphate. The temperature should not be allowed to drop below about 500° C. since the sodium or lithium phosphate salts formed in the melt will become so viscous that the growth of blocks of calcium M phosphate is retarded. It is preferred to maintain the temperature between about 550° C. and about 750° C.

The temperature is maintained in the range of from about 500° C. to about the melting point of the asbestiform crystal for a period of time between about 20 minutes and about 2 hours to permit hexagonally shaped blocks of calcium M phosphate to grow in a matrix of soluble M phosphate. The length of time is dependent on the temperature and the size of the desired crystal.

Then, the resulting mass is allowed to cool to about 100 C. or less, and the mass is contacted with water to dissolve the soluble M phosphate. I prefer to break the resulting mass into pieces ranging from about one centimeter to about 10 centimeters average diameter, and place the pieces in at least 10 times its volume of agitated, warm water. When the soluble M phosphate is dissolved, the calcium M phosphate blocks having somewhat of a hexagonal shape, are left. The calcium M phosphate blocks are recovered by conventional means, e.g., decantation, filtration, centrifugation and the like.

The recovered calcium M phosphate blocks are then fiberized to form the asbestiform, crystalline calcium M phosphate of the present invention. The blocks can be fiberized by conventional techniques such as grinding, crushing, levigating, titurating and the like. I prefer to use a mortar and pestle for small batches, but to pass larger batches through a hammermill, or through a wet ball mill or roller mill, to fiberize the blocks to yield the asbestiform crystalline calcium M phosphate of the present invention.

The length and diameter of the asbestiform, crystalline calcium M phosphate is affected by a number of factors, such as: (1) the ratio of the source materials; (2) the type and quantity of trace elements; (3) the size of the blocks of calcium M phosphate; (4) the temperature at which the blocks are formed; (5) the degree of fiberization, and the like. All of these factors and others are interrelated and optimum conditions for preparing the asbestiform crystals with the desired diameter and length for a particular application can be determined by routine experimentation in light of the present disclosure.

CHARACTERIZATION OF THE ASBESTIFORM CRYSTALS

The asbestiform crystalline calcium M phosphate grown according to the process of the present invention is fairly uniform from batch to batch. As noted above, the length and diameter of the asbestiform crystals depends on the size of the block of calcium M phosphate, the degree of fiberization, composition of the melt and the like. Generally, crystals with the shorter lengths are obtained from melt compositions containing more than 20 mole percent $M_2O$. The average diameter of the crystals at 0.1 micron can be obtained with ease, and average diameters as small as about 0.05 micron can be obtained when care is used. At lower concentrations of M, crystals having an average diameter of about 1 micron, or larger, can be obtained, and a typical batch will provide crystals having an average diameter between about 0.1 micron and about 1.0 micron. In all cases, the aspect ratio (the length to average diameter ratio) of the asbestiform, crystalline calcium M phosphate is at least 5:1, usually at least 10:1, and frequently at least 50:1. Lengths as much as one centimeter have been obtained.

The asbestiform crystalline calcium M phosphate of the present invention has good thermal stability and inertness. The asbestiform crystals are reasonably resistant to corrosion in water, 0.1 normal sodium hydroxide and 0.1 normal hydrochloric acid.

The X-ray diffraction pattern of the asbestiform crystalline calcium M phosphate using CuKα radiation was obtained. These diffraction patterns and the d-spacings in Angstroms (A) for the asbestiform crystalline calcium sodium phosphate and calcium lithium phosphate are presented in Table 1.

TABLE 1

| X-RAY DIFFRACTION PATTERNS OF ASBESTIFORM CRYSTALLINE CALCIUM M PHOSPHATE | | | |
|---|---|---|---|
| CALCIUM SODIUM PHOSPHATES | | CALCIUM LITHIUM PHOSPHATES | |
| Peaks (°2θ) | d-spacing (A) | Peaks (°2θ) | d-spacing (A) |
| 13.4 | 6.59 | 13.5 | 6.54 |
| 16.7 | 5.29 | 18.6 | 4.75 |
| 18.3 | 4.82 | 24.6 | 3.59 |
| 23.4 | 3.77 | 26.0 | 3.40 |
| 23.6 | 3.74 | 27.6 | 3.19 |
| 26.0 | 3.39 | 27.8 | 3.18 |
| 27.0 | 3.27 | 28.7 | 3.076 |
| 27.5 | 3.21 | 28.9 | 3.054 |
| 28.0 | 3.15 | 29.9 | 2.952 |
| 29.6 | 2.982 | 31.65 | 2.789 |
| 31.1 | 2.838 | 37.3 | 2.366 |
| 34.1 | 2.589 | 49.0 | 1.801 |
| 35.9 | 2.459 | | |
| 42.6 | 2.072 | | |
| 48.5 | 1.820 | | |
| 55.1 | 1.602 | | |

The above X-ray diffraction patterns characterize the asbestiform crystals and distinguish them from the acicular crystalline calcium metaphosphate of the parent application Ser. No. 103,787, abandoned.

The asbestiform calcium sodium phosphate crystals have characteristic d-spacings at 5.29, 4.82, 3.39 and 3.15 A, whereas the asbestiform calcium lithium phosphate crystals have characteristic d-spacings at 4.75, 3.59, 3.40 and 3.054 A.

FIG. 1 is a picture taken with the aid of an electron scanning microscope at a magnification of 1,000 times of a typical batch of asbestiform crystalline calcium sodium phosphate of the present invention showing, in addition to the asbestiform crystals, typical small bundles which have not been fully fiberized.

USES OF THE ASBESTIFORM CRYSTALS

Because of their unusual chemical and physical properties, the asbestiform crystalline calcium M phosphates of the present invention can find a wide variety of uses. For example, mats or felts of the asbestiform crystals are readily obtained by suspending the asbestiform crystals in a liquid, such as water or a glycerine-water mixture, followed by removal of the dispersing liquid. The mats or felts are useful as filters to remove solids from gaseous or liquid streams. Finely fiberized asbestiform crystals can be incorporated with oils such as silicone oil to provide thick greases useful as high temperature lubricants. The asbestiform crystals are good thermal insulators, and are also useful as reinforcing agents for cellulosic fibers and papers.

The asbestiform crystals of the present invention are also useful as a partial or complete substitute for asbestos in asbestos/cement mixtures to make reinforced cement products. Up to 70 weight percent asbestiform crystals, based on the weight of cement present, provides a reinforced cement product without the health hazard of asbestos fibers.

In addition, the asbestiform crystals can be incorporated into oil-based and latex paints to alter the rheological and drying properties of such paints, and it is believed that they will enhance flame retardant properties of the resulting paint.

The asbestiform crystalline calcium M phosphates of the present invention are particularly useful to form laminates and composites with organic polymeric materials. Depending upon the intended use and physical properties desired, from about 1 percent to about 99 percent by weight of the composite or laminate can be the asbestiform crystals. Preferred compositions can readily be determined by routine experimentation by those skilled in the art. Suitable organic polymeric materials which can be used with the asbestiform crystals to form laminates or composites include: styrene-acrylonitrile-butadiene; acetal copolymers and homopolymers; acrylic ester homopolymers and copolymers; allyl esters, such as diallyl phthalate, diallyl isophthalate, allyl diglycol carbonate and the like; alkyd molding compounds which comprise unsaturated polyester prepolymer, unsaturated monomer, and a source of free radicals; amino plastics prepared by reacting an amino compound, such as melamine or urea, with formaldehyde; cellulosic plastics, such as cellulose nitrate, ethyl cellulose, cellulose acetate, cellulose butyrate, and the like; epoxy resins, such as the reaction product of epichlorohydrin and bisphenol A, and the like; nylons, i.e., long-chain synthetic polymeric amides with recurring amide groups as an integral part of the main polymer chain, such as the nylons prepared by reacting equimolar amounts of hexamethylene diamine and adipic acid, sebacic acid or dodecanoic acid, and the like; phenolic resins such as the phenol-formaldehyde type resins; poly(amideimide) plastics such as those prepared by the condensation of trimellitic anhydride and various aromatic diamines; polyolefins, such as polyethylene, polypropylene, polybutylene and the like; polyesters such as the condensation product of 1,4-butanediol and terephthalates with ethylene glycol, and the like; polyurethanes, polyvinyl and vinyl copolymers such as polyvinyl chloride and the like; polystyrene and polystyrene resins such as styrene-acrylonitrile and the like; thermoplastic elastomers such as styrene-elastomer block copolymers, urethane block copolymers, polyester block copolymers, polyolefin blends, and the like; and alloys prepared by mixing two or more polymers together by mechanical means. Other examples will occur to those skilled in the art in light of the above listing, which is intended to be instructive and not limiting.

This invention is illustrated by, but not limited to, the following Examples wherein all percentages are given by weight unless otherwise indicated.

In the following Examples parts and percentages are by weight unless otherwise specified.

EXAMPLE I

To 76.29 grams of calcium carbonate were added 150 milliliters water, 148.15 grams of monosodium dihydrogen phosphate monohydrate and 232.14 grams of 85 percent phosphoric acid. The mole ratio of ingredients was 19.0 percent $Na_2O$, 28 percent $CaO$ and 53.0 percent $P_2O_5$. The above ingredients were thoroughly mixed in a container, a 1000 cc. glass beaker which was placed on a hot plate to evaporate excess moisture. Then, a 500 cc. platinum dish containing the above mixture was placed in a furnace at about 200° C. for 80 minutes to drive off residual moisture. Then the temperature was increased to 800° C. and maintained at that temperature for 1 hour. Thereafter, the temperature was decreased to 600° C. and maintaned at this temperature for 1 hour. The platinum dish and the contents were allowed to cool to about 100° C. and the contents were transferred to a 4-liter beaker containing about 2 liters of boiling water. After about 3 hours, hexagonally shaped blocks were recovered by filtration. The blocks were washed with water and methanol, and ground in a mortar and pestle to fiberize the blocks into asbestiform crystals.

A sample of the asbestiform crystals was analyzed by atomic absorption spectrophotometry, and the resultant elemental analysis confirmed a structure of $[CaNa(PO_3)_3]_n$ of high molecular weight.

EXAMPLE II

To 72.35 grams of calcium carbonate were added a heated mixture of 300 milliliters water, 96.59 grams of lithium metaphosphate and 189.38 grams of 86 percent phosphoric acid. The mole ratio of ingredients was 21.0 percent $Li_2O$, 27 percent $CaO$ and 52.0 percent $P_2O_5$. The above ingredients were thoroughly mixed in a container, a 1000 cc. glass beaker, which was placed on a hot plate to evaporate excess moisture. Then, a 500 cc. platinum dish containing the above mixture was placed in a furnace at about 200° C. for 20 minutes to drive off residual moisture. Then the temperature was gradually increased to 790° C. to form melt. Then the temperature was reduced to about 700° C. and maintained over the weekend. The platinum dish and the contents were allowed to cool to about 100° C. and the contents were transferred to a 4-liter beaker containing about 2 liters of boiling water. After about 3 hours, hexagonally shaped blocks were recovered by filtration. The blocks were washed with water and methanol, and ground in a mortar and pestle to fiberize the blocks into asbestiform crystals.

A sample of the asbestiform crystals was analyzed by atomic absorption spectrophotometry, and the resultant elemental analysis confirms a structure of $[CaLi(PO_3)_3]_n$ of high molecular weight.

Following the general procedures of Examples I and II, asbestiform crystalline calcium M phosphates were prepared from various mole percent compositions at various initial melt temperatures and crystallization temperatures. Representative examples are set forth in following Table 2.

TABLE 2

| EXAMPLE | MOLE PERCENT | | | | TEMPERATURE | |
| --- | --- | --- | --- | --- | --- | --- |
| | $Na_2O$ | $Li_2O$ | $P_2O_5$ | CaO | °C.* | °C.** |
| III | 19 | — | 53 | 28 | 700 | 700 |
| IV | — | 17 | 50 | 33 | 850 | 745 |
| V | 21 | — | 52 | 27 | 1000 | 690 |
| VI | 20 | — | 60 | 20 | 650 | 450 |
| VII | — | 19 | 50 | 31 | 850 | 700 |
| VIII | 23 | — | 51 | 26 | 850 | 650 |
| IX | 17 | — | 50 | 33 | 840 | 760 |
| X | 21 | — | 52 | 27 | 800 | 600 |
| XI | 21 | — | 52 | 27 | 800 | 600 |
| XII | 21 | | 52 | 27 | 800 | 600 |

*initial melt temperature
**crystallization temperature

A representative sample of asbestiform crystals of Example X was analyzed by atomic absorption spectrophotometry. Found: Ca 13.12 percent; Na 6.80 percent; P 30.49 percent; Fe 167 ppm. Calculated: Ca 13.36 percent; Na 7.66 percent; P 30.98 percent.

Representative samples of the asbestiform crystals of Example IX were evaluated for tensile strength and Young's modulus. In two separate evaluations the tensile strength was in the range of about 97 to 114 $kg/mm^2$ and the Young's modulus was in the range of about 9,700 to 11,000 $kg/mm^2$.

About 15 grams of each of the asbestiform crystals from Examples I and II were separately admixed with an epoxy resin and curing agent, namely Epon 828 and curing agent 2, available commercially from Shell Oil Company, Houston, Tex. Bars about 1 centimeter deep, 3 centimeters wide and 5 centimeters long were cast from the mixtures. For comparative purposes, epoxy resin without reinforcement was cast into similar bars. Then the bars were pulled on an Instron Tensile Testing machine until break occurred. At this 25 percent volume loading, the breaking load doubled over the epoxy resin that did not contain the asbestiform crystalline calcium M phosphate.

The asbestiform crystals from Example XII were fiberized using a hammermill. The asbestiform crystals in an amount to provide 15 percent by volume were admixed with an epoxy resin and curing agent, namely EPON 815 and curing agent 2, available commercially from Shell Oil Company, Houston, Tex. Cured test strips, with the asbestiform crystals and without reinforcement, averaging about 2.1 mm. thick, about 13.2 mm. wide and about 76.2 mm. long were tested for tensile modulus and flexural modulus using an Instron Tensile Testing machine, at a span of about 50.8 mm. An average tensile modulus of 506 kg/mm$^2$ and an average flexural modulus of 580 kg/mm$^2$ were obtained for this 15 percent loading of the asbestiform crystals compared to an average tensile modulus of 321 kg/mm$^2$ and an average flexural modulus of 366 kg/mm$^2$ for the cured epoxy resin without the asbestiform crystals.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. Asbestiform, crystalline calcium M phosphate wherein M is sodium or lithium.

2. An asbestiform phosphate of claim 1 wherein M is sodium having characteristic d-spacings at about 5.29, 4.82, 3.39 and 3.15 Angstroms.

3. An asbestiform phosphate of claim 1 wherein M is lithium having characteristic d-spacings at about 4.75, 3.59, 3.40 and 3.054 Angstroms.

4. An asbestiform phosphate of claim 1, 2 or 3 having an aspect ratio of at least 5:1.

5. An asbestiform phosphate of claim 1, 2 or 3 having an aspect ratio of at least 10:1.

6. An asbestiform phosphate of claim 1 or 2 having an aspect ratio of at least 50:1.

7. An asbestiform phosphate of claim 1 or 2 having an aspect ratio of at least 10:1 and an average diameter between about 0.05 micron and about 1 micron.

8. An asbestiform phosphate of claim 1 or 2 having an aspect ratio of at least 10:1 and an average diameter between about 0.1 micron and about 0.5 micron.

9. A process for preparing asbestiform crystalline calcium M phosphate wherein M is sodium or lithium which comprises:
   (a) bringing together under reaction conditions a source of oxygen, calcium, phosphorus and M wherein the mole ratios are about 15 mole percent to about 30 mole percent $M_2O$, about 48 mole percent to about 60 mole percent $P_2O_5$, and about 20 mole percent to about 37 mole percent CaO to form a melt of a phosphate salt mixture;
   (b) maintaining the phosphate salt mixture at a temperature below about the melting point of the calcium M phosphate for a sufficient time to form blocks of calcium M phosphate; and
   (c) fiberizing the blocks into said asbestiform crystalline calcium M phosphate.

10. A process of claim 9 wherein the melt has a mole ratio of about 17 mole percent to about 25 mole percent $M_2O$, about 48 mole percent to about 53 mole percent $P_2O_5$, and about 25 mole percent to about 32 mole percent CaO.

11. A process of claim 9 wherein the blocks of calcium M phosphate are separated from other salts by contacting the phosphate salt mixture with water after the blocks of calcium M phosphate have formed.

12. A process for preparing asbestiform cyrstalline calcium M phosphate wherein M is sodium or lithium which comprises:
   (a) bringing together under reaction conditions a source of oxygen, calcium phosphorus and M wherein the mole ratios are about 17 mole percent to about 25 mole percent $M_2O$, about 48 mole percent to about 53 mole percent $P_2O_5$ and about 25 mole percent to about 32 mole percent CaO to form a melt of a phosphate salt mixture;
   (b) maintaining the phosphate salt mixture at a temperature below about the melting point of the calcium M phosphate for a sufficient time to form blocks of calcium M phosphate; and
   (c) fiberizing the blocks into said asbestiform crystalline calcium M phosphate wherein the source of calcium is calcium carbonate or calcium hydroxide, and the source of phosphorus is a sodium or lithium phosphate, phosphoric acid or mixtures thereof.

13. A process of claim 9 wherein the phosphate salt mixture is maintained between about 500° C. and about 780° C.

14. A process of claim 9 wherein the phosphate salt mixture is maintained between about 550° C. and about 750° C.

15. A composite which comprises from about 1 to about 99 percent by weight asbestiform crystalline calcium M phosphate wherein M is sodium or lithium, having an aspect ratio of at least 10:1 and from about 1 to about 99 percent by weight organic polymeric materials.

* * * * *